(12) United States Patent
Uchiyama et al.

(10) Patent No.: US 7,237,849 B2
(45) Date of Patent: Jul. 3, 2007

(54) WHEEL FOR TWO-WHEELED MOTOR VEHICLE

(75) Inventors: Mikio Uchiyama, Wako (JP);
Kazuhiko Gogo, Wako (JP); Masaki Agata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/158,775

(22) Filed: Jun. 22, 2005

(65) Prior Publication Data
US 2006/0022515 A1 Feb. 2, 2006

(30) Foreign Application Priority Data
Jul. 27, 2004 (JP) .............................. 2004-219358

(51) Int. Cl.
*B60B 27/00* (2006.01)
*B60B 21/06* (2006.01)
(52) U.S. Cl. .................................... 301/110.5; 301/59
(58) Field of Classification Search ................. 301/59, 301/105.1, 110.5, 110.6; 29/894.36, 894.362
See application file for complete search history.

(56) References Cited

U.S. PATENT DOCUMENTS

| 2,496,615 | A | * | 2/1950 | Ayers ........................ 301/110.6 |
| 3,287,797 | A | * | 11/1966 | Wilcox et al. .......... 29/894.362 |
| 4,626,036 | A | * | 12/1986 | Hinsberg et al. ............... 301/59 |
| 5,494,337 | A | * | 2/1996 | Behnke ........................ 301/59 |
| 6,866,345 | B2 | * | 3/2005 | Fakhoury et al. ......... 301/105.1 |

FOREIGN PATENT DOCUMENTS

| JP | 4-328001 | 11/1992 |
| JP | 11-321206 | 11/1999 |

* cited by examiner

*Primary Examiner*—Jason R. Bellinger
(74) *Attorney, Agent, or Firm*—Hamre, Schumann, Mueller & Larson, PC

(57) ABSTRACT

A wheel for a two-wheeled motor vehicle and including a hub, a rim, a spokes coupling the hub and the rim. The hub has a lightening portion formed inside a sprocket flange such that there remains sufficient flange strength and sufficient weight reduction is realized. The lightening portion is axially inside a bearing insertion hole, opens radially inwardly and has a maximum diameter longer than diameters of the bearing insertion hole and an axle hole.

2 Claims, 6 Drawing Sheets

WHEEL FOR TWO-WHEELED MOTOR VEHICLE

FIELD OF THE INVENTION

The present invention relates to a spoked wheel for a two-wheeled motor vehicle. In particular, the present invention relates to the structure of a molded hub thereof

BACKGROUND OF THE INVENTION

There is a wheel hub, the entirety of which is integrally molded by aluminum die casting or the like, disclosed in Japanese Unexamined Patent Publication No. Hei 11(1999)-321206. The wheel hub includes a hub cylindrical portion through which an axle is passed and a pair of flanges on the left and right which are provided at opposite end portions of the hub cylindrical portion along the axial direction. A sprocket for driving a chain and a brake disc are respectively fastened to one flange with bolts, and lightening portions which are open to the outside are provided in side surfaces of the flanges.

Further, there is also a wheel hub disclosed in Japanese Unexamined Patent Publication No. Hei 4(1992)-328001 in which a hub cylindrical portion and left and right flanges are separately formed, in which axle insertion portions are provided at rotation center portions of the flanges, and in which lightening portions are provided in inner portions thereof. Note that, in the present application, the axial direction of a hub and flanges means the direction of the rotation axis of the hub.

Incidentally, of the above-described pair of flanges on the left and right, the sprocket flange to which the sprocket is attached is a portion to which driving force is transmitted. Since driving force is usually larger than braking force, the sprocket flange needs to be given sufficient flange strength, and is thick-walled compared to the brake flange on the opposite side.

Because of this, the total weight of the hub tends to be large. Accordingly, a lightening portion is provided to realize weight reduction. In order to realize further weight reduction, it is desirable that the lightening portion be provided in a more inner portion of the flange.

However, the shape of such a lightening portion is limited to a recessed shape which is open to the outside in the axial direction. Accordingly, there are natural restrictions on the shape of the lightening portion, and it has been difficult to freely form the lightening portion to have an optimum shape for obtaining needed strength and to realize sufficient weight reduction.

Further, if flanges are formed separately from a hub cylindrical portion as in the aforementioned known example, a lightening portion can be provided in a more inner portion of the sprocket flange. However, the shape of the lightening portion remains limited to a recessed shape which is open to the outside in the axial direction. In addition, the whole of the wheel hub cannot be formed integrally. However, in terms of manufacturing efficiency, it is desirable that the whole can be formed by one-time molding in a single step. Furthermore, it is also desirable that molding can be performed without using complex dies including a core or the like. An object of the present invention is to realize such demands.

SUMMARY OF THE INVENTION

In order to solve the above-described problems, a wheel for a two-wheeled motor vehicle is provided, which includes a hub, a rim, and spokes coupling the hub and the rim, the hub including a hub cylindrical portion and a sprocket flange integrally, the hub cylindrical portion having an axle hole which is formed to penetrate the hub cylindrical portion and through which an axle is passed, the sprocket flange being formed at one end portion of the hub cylindrical portion along an axial direction to protrude in a radial direction and to be used for attaching a chain sprocket, the wheel including a bearing insertion hole through which a bearing for the axle is attached, the bearing insertion hole being provided in a rotation center portion of the sprocket flange coaxially with the axle hole to have a larger diameter than the axle hole, and a lightening portion being provided more inward than the bearing insertion hole, and lightening portion being formed in such a manner that a thick-walled portion of the sprocket flange is bored from a rotation center side toward an outside in the radial direction and being open only to a rotation center direction, and that the bearing insertion hole and the axle hole are placed on opposite sides of the lightening portion along a rotation axis direction of the hub, and a maximum diameter of the lightening portion is larger than diameters of the bearing insertion hole and the axle hole.

The lightening portion which is formed from the rotation center side in the radial direction and in which the diameter of an intermediate portion along the axial direction is larger than those of both end portions along the axial direction is provided in the thick-walled portion of the sprocket flange. Accordingly, it is possible to freely form the lightening portion having an optimum shape for obtaining needed strength and realizing sufficient weight reduction, and to efficiently improve the strength of the flange.

Further, a collar-retaining protruding portion may be formed at a position of a junction between the hub cylindrical portion and the sprocket flange on an inner surface of the axle hole. Accordingly, the junction between the hub cylindrical portion and the sprocket flange where stress is most concentrated can be reinforced by the collar-retaining protruding portion.

DETAILED DESCRIPTION OF THE INVENTION

Figure 1:
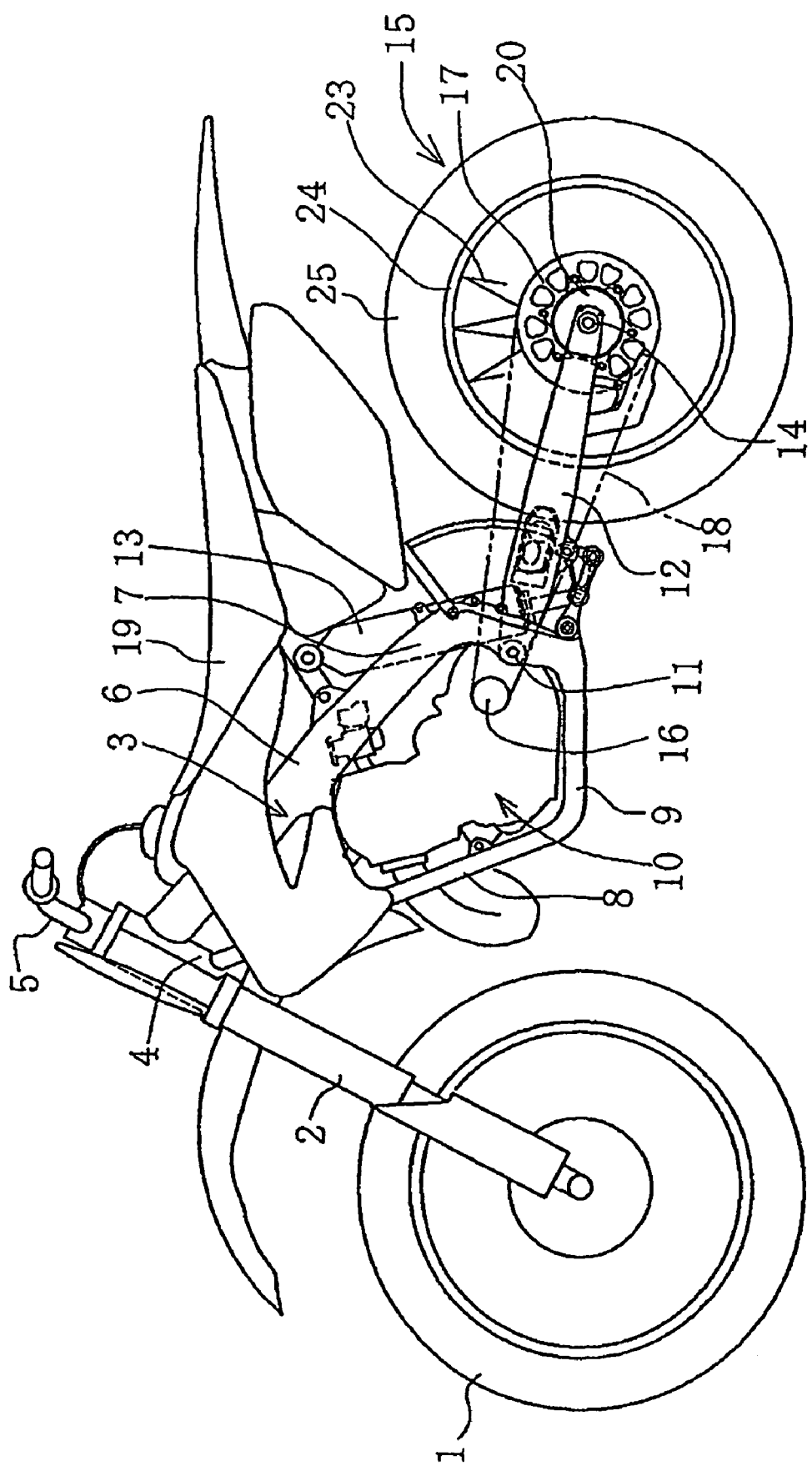
FIG. 1 is a vehicle body, left side view of an off-road, two-wheeled, motor vehicle to which the present invention is applied.

Hereinafter, an embodiment is described based on the drawings. FIG. 1 shows a vehicle body, left side view of an off-road, two-wheeled, motor vehicle to which the present invention is applied. A front wheel 1 is rotatably supported through a front fork 2 by a head pipe 4 provided on a front portion of a vehicle body frame 3, and is steered with a handlebar 5.

The vehicle body frame 3 includes a main frame 6, a pivot frame 7, a down frame 8, and a lower frame 9. A four-cycle air-cooled engine 10 is supported by body frame 3.

The pivot frame 7 swingably supports front end portions of rear arms 12 with a pivot shaft 11. A cushion 13 for a rear suspension is supported through a linkage between the main frame 6 and front portions of the rear arms 12. At rear end portions of the rear arms 12, a rear wheel 15 is supported by an axle 14.

A lower end portion of the cushion 13 is coupled to a linkage placed below the front portions of the rear arms 12. This linkage includes a link arm 13b and a delta link 13a which is provided below the front portions of the rear arms 12 and which has a triangular shape when viewed from the side. The delta line 13a has three vertices and is connected to the lower end portion of the cushion 13 at point A, connected to a mounting bracket 12a at point B, and connected to a rear end portion of the link arm 13b at point C. The mounting bracket 12a is provided on a lower surface of a cross member 12b, which couples the rear arms 12 on the left and right, and protrudes downward. The link arm 13b is placed along the longitudinal direction. A front end portion of the link arm 13b is connected to the pivot frame 7 at point D.

The rear wheel 15 is driven by the engine 10 through a chain 18 which is wound on a drive sprocket 16 of the engine 10 and a driven sprocket 17 provided the rear wheel 15. Reference numeral 19 denotes a seat.

Figure 2:
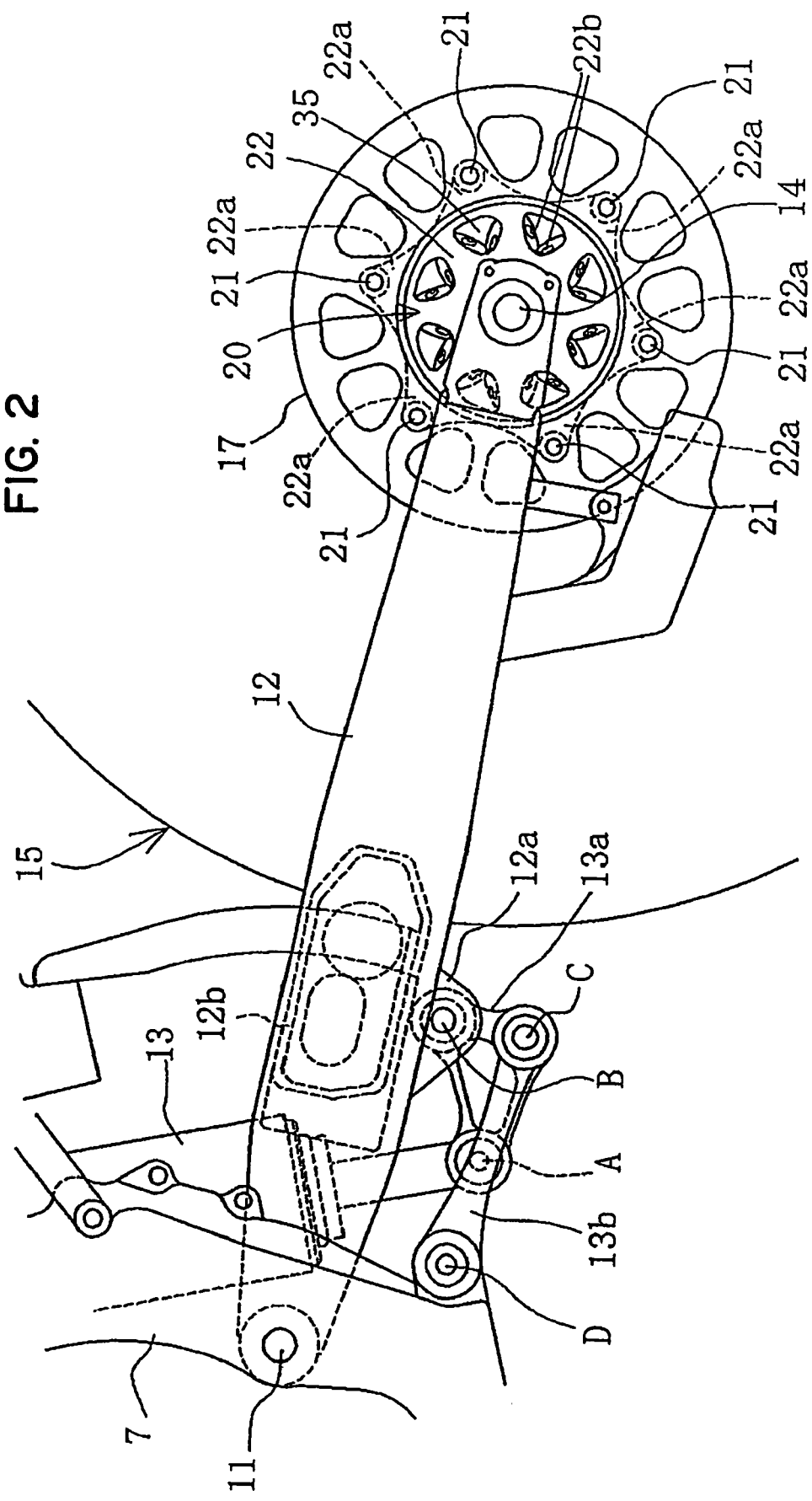
FIG. 2 is an enlarged side view of a rear-wheel supporting portion.

FIG. 2 is an enlarged side view of a rear-wheel supporting portion. The rear wheel 15 includes a hub 20 supported by the axle 14 which is coaxial with the driven sprocket 17. The driven sprocket 17 is attached to a sprocket flange 22 of the hub 20 with bolts 21. The bolts 21 are provided at regular intervals along the circumferential direction. Reference numeral 22a denotes a bolt mounting portion provided in a peripheral portion of the sprocket flange 22, and reference numeral 22b denotes a spoke mounting portion.

Figure 3:
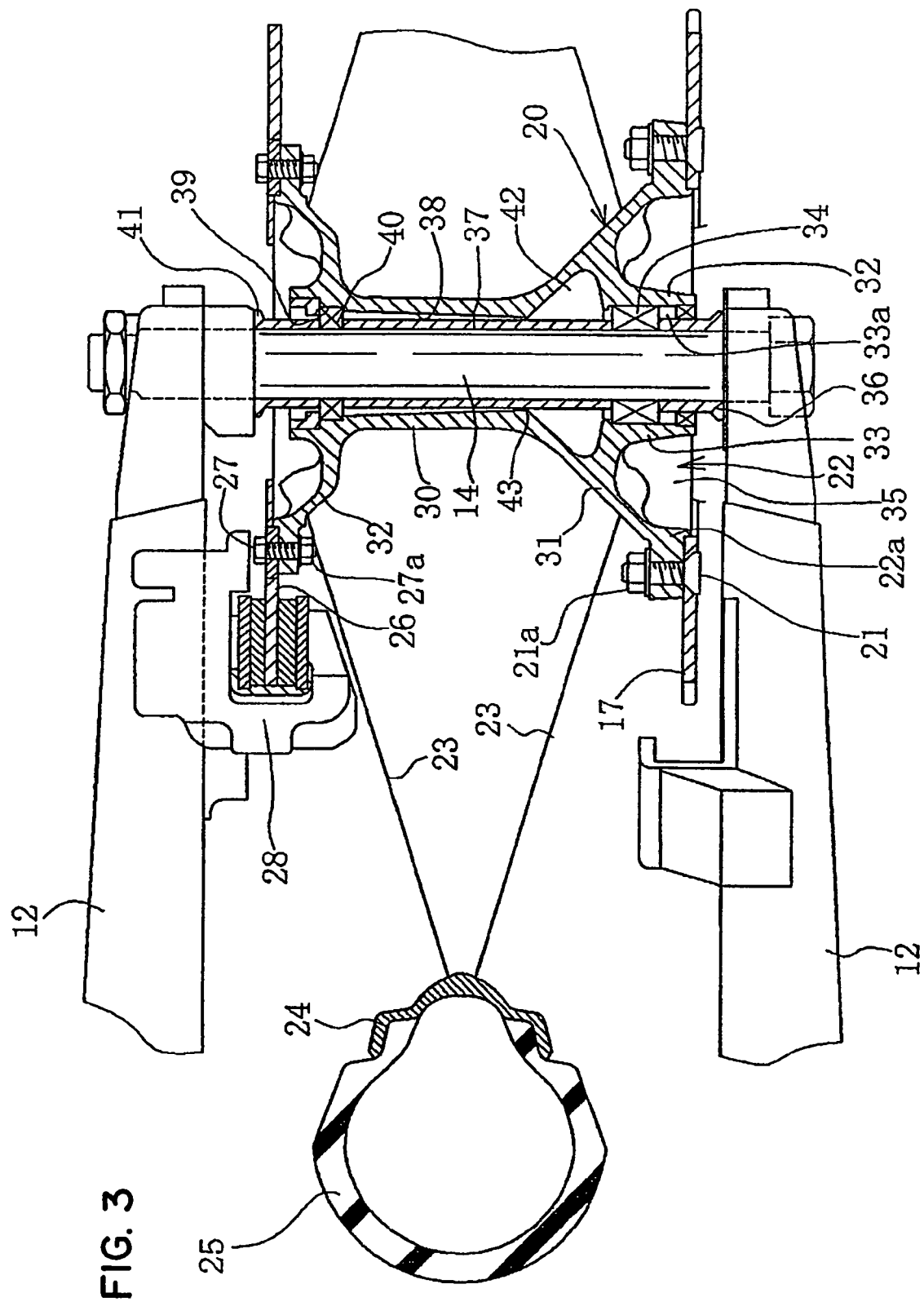
FIG. 3 is an enlarged cross-sectional view of the rear-wheel supporting portion taken along the axial direction of an axle.

FIG. 3 shows a cross section of the rear wheel 15 taken along the axial direction. The rear wheel 15 includes a hub 20, a rim 24 coupled to the hub 20 through spokes 23, and a tire 25 attached to the rim 24. One end of each spoke 23 is inserted into the sprocket flange 22 or a brake flange 32 from the outside toward the inside, and the other end thereof is passed through a nipple (not shown) provided in the rim 24 which is placed on the vehicle body center. Thus, the position and shape of the rim 24 are maintained by the tightening force applied by the spokes 23 and position of the nipples.

The hub 20 has a hub cylindrical portion 30 through which the axle 14 passes. The sprocket flange 22 and the brake flange 32 are formed at opposite ends of the hub cylindrical portion 30. The sprocket flange 22 and the brake flange 32 protrude from and are integrated with the hub cylindrical portion 30 in the radial direction. The sprocket flange 22 has a slope portion 31. The slope portion 31 is continuous from an end portion of the hub cylindrical portion 30 along the axial direction to spread outward in the radial direction. The bolt mounting portions 22a protrudes in the radial direction in a peripheral portion of the slope portion 31.

The slope portion 31 slopes relatively gently, and makes a gentle cross-sectional change in the junction with the hub cylindrical portion 30. Further, the center-side end portions of the spokes 23 are coupled to an intermediate portion of the slope portion 31. Reference numeral 21a denotes a nut which engages with the bolt 21.

On the opposite side of the hub cylindrical portion 30 from the sprocket flange 22 along the axial direction, the brake flange 32 is formed. An inner portion of a disc rotor 26 constituting a rear disc brake is attached to a peripheral portion of the brake flange 32 with bolts 27 and nuts 27a. Reference numeral 28 denotes a brake caliper.

A bearing holder portion 33 is provided at a rotation center portion of the sprocket flange 22. A bearing insertion hole 33a is provided inside the bearing holder portion 33. A bearing 34 for the axle 14 is fitted in the bearing insertion hole 33a. Around the bearing holder portion 33 in the outer surface of the sprocket flange 22, a recess portion 35 is provided which is used for mounting spokes. Recess portion 35 is formed from the outside along the axial direction.

The inner end of the bearing 34 along the axial direction is positioned by one end portion of a long collar 37, and the outer end thereof is positioned by a flange collar 36 placed between the bearing 34 and the rear arm 12.

The long collar 37 is placed along the lateral direction in an axle hole 38 which is formed to penetrate the hub cylindrical portion 30 in the vehicle width direction. The other end portion of the long collar 37 is positioned by the inner end of a bearing 40 along the axial direction, which bearing 40 is fitted in a bearing insertion hole 39 formed at a rotation center portion of the brake flange 32. The inner end of the bearing 40 along the axial direction is positioned by a step portion of the brake flange 32 which is formed at an end portion of the bearing insertion hole 39, and the outer end thereof is positioned by a flange collar 41 placed between the bearing 40 and the rear arm 12. The bearing insertion hole 39 is coaxial with the bearing insertion hole 33a and the axle hole 38.

In a thick-walled portion of the sprocket flange 22, a lightening portion 42 is formed, which has an approximately angle cross section in the axial direction. This lightening portion 42 is formed to have a width from the junction between the slope portion 31 and the hub cylindrical portion 30 to the bearing insertion hole 33a in the axial direction of the hub 20 and is bored from the rotation center side toward the outside in the radial direction.

Sprocket flange 22 (see FIG. 1) receives the driving force of the engine 10 transmitted through the chain 18 and the driven sprocket 17, and needs to be given sufficient flange strength to withstand the force. Since driving force is usually larger than braking force, the sprocket flange 22 is formed to be larger than the brake-side flange 32 on the opposite side along the axial direction, thus ensuring needed strength. In addition, the sprocket flange 22 is lightened by forming the recess portion 35 and the lightening portion 42.

Figure 4:
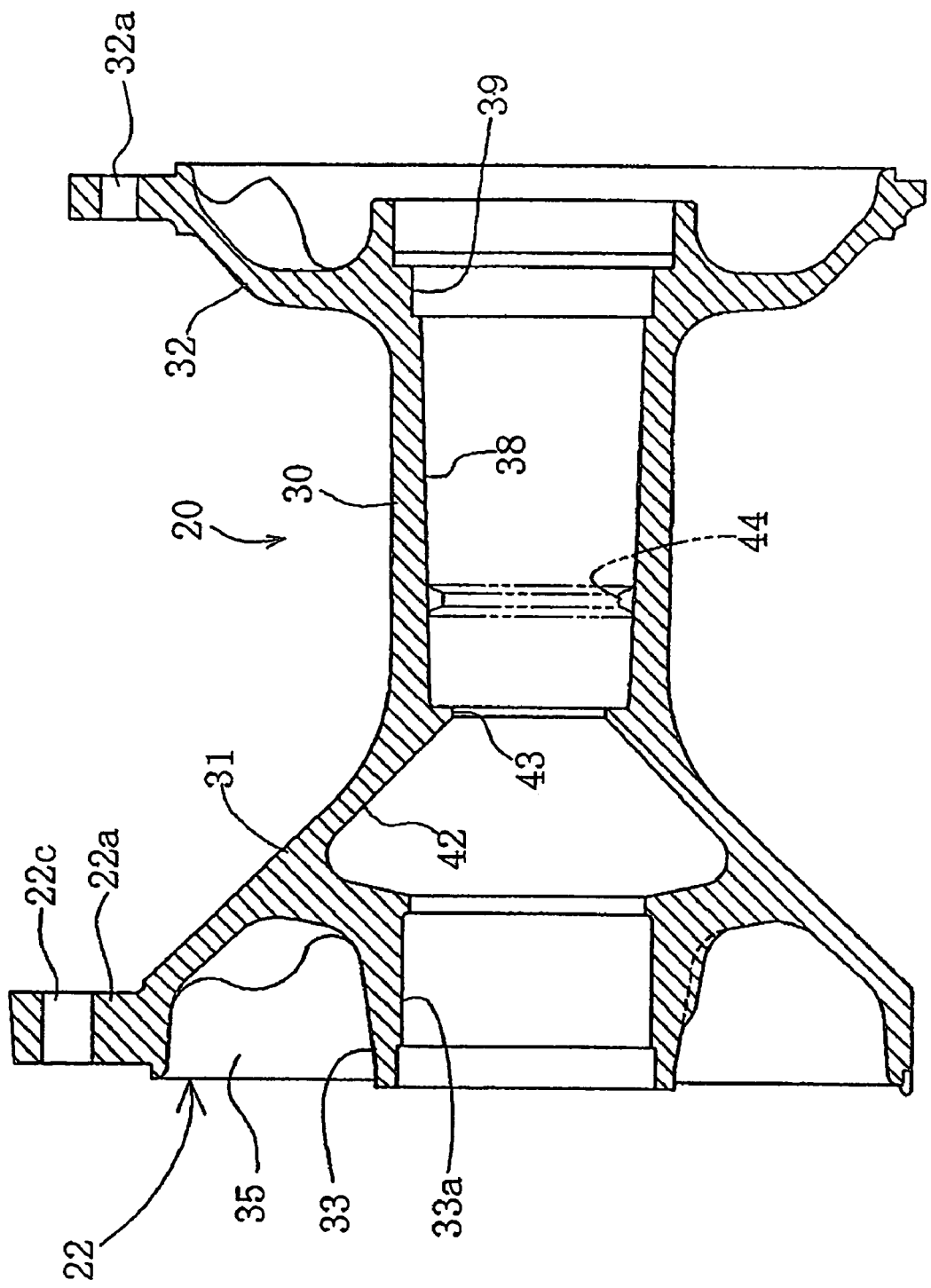
FIG. 4 is an enlarged view showing a cross section of a hub taken along the axial direction.

FIG. 4 is an enlarged view showing a cross section of the hub 20 taken along the axial direction. The hub 20 is an integrally-molded member made of an aluminum alloy, and is preferably manufactured by die. However, other known methods such as forging or gravity casting may also be adopted.

The entire hub 20 including the sprocket flange 22, the hub cylindrical portion 30, and the brake flange 32 are integrally molded. The axle hole 38 has a tapered shape in which the diameter thereof gradually decreases toward the sprocket flange 22 side. At the junction between the slope portion 31 and the hub cylindrical portion 30, a collar retainer 43 is integrally formed of an annular protruding portion which protrudes inwardly. The collar retainer 43 delimits the axle hole 38 and the lightening portion 42, and is also the portion which is the minimum diameter of the axle hole 38.

The collar retainer 43 is provided in order to center the long collar 37. Heretofore, as indicated by two-dot chain lines denoted by reference numeral 44 in the drawing, a collar retainer has been often formed in an intermediate portion along the axial direction. However, in this embodiment, the collar retainer 43 is formed to be closer to one side along the axial direction, which side is the lightening portion 42 side. Reference numerals 22c and 32a in the drawing denote through holes for bolts.

In an assembly procedure for a bearing in the hub 20, first, the bearing 40 is pressed in the bearing insertion hole 39 and positioned by the step portion of the brake flange 32. Then, the long collar 37 is inserted into the axle hole 38 from the bearing insertion hole 33a on the opposite side. Subsequently, the bearing 34 is pressed in the bearing insertion hole 33a. Accordingly, the bearing 40 side is a reference for incorporating the long collar 37. Consequently, the provision of the collar retainer 43 in the vicinity of the bearing 34 on the opposite side makes it possible to retain the end portion of the long collar 37 on the bearing 34 side, and effectively center the long collar 37. Otherwise, long collar 37 is prone to being decentered.

Figure 5:
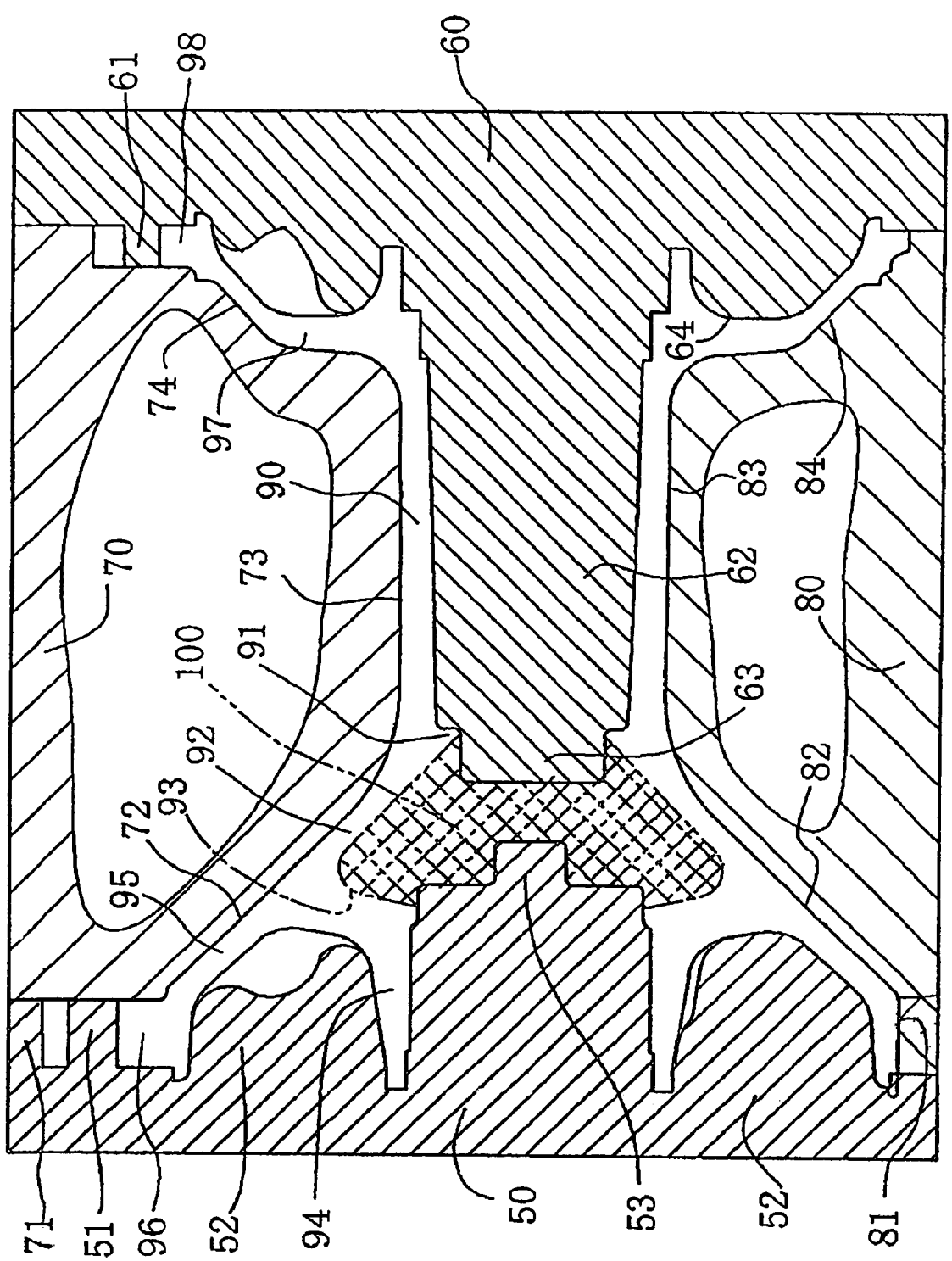
FIG. 5 is a conceptual, cross-sectional view showing a method of molding the hub.

FIG. 5 is a conceptual drawing showing a method of molding the hub 20. A die for molding the hub 20 is formed of left, right, upper, and lower split dies 50 to 80. The split dies 50 and 60 slide to the left and right in the axial direction of the hub cylindrical portion 30 in the drawing.

The split die 50 forms the outer portion of the sprocket flange 22 along the axial direction, the bearing holder portion 33, the bearing insertion hole 33a, and part of the lightening hole 42. The split die 60 forms the outer portion of the brake flange 32 along the axial direction and the basic shape of the bearing insertion hole 39.

The split dies 70 and 80 slide in the vertical direction in the drawing, and form the hub cylindrical portion 30, and the outer surfaces of the sprocket flange 22 and the brake flange 32 along the radial direction.

The split die 50 includes pin-shaped portions 51 for forming the through holes 22c for bolts, a protruding portion 52 for forming the recess portion 35, and a central protruding portion 53 which protrudes in the axial direction in order to form the bearing insertion hole 33a and part of the lightening portion 42.

The split die 60 includes pin-shaped portions 61 for forming the through holes 32a for bolts, and a central protruding portion 62 which protrudes long in the axial direction in order to form the axle hole 38. The central protruding portion 62 is formed in a shape tapering down in the protruding direction. The tip of the central protruding portion 62 constitutes a thin-diameter portion 63, which faces the tip of the central protruding portion 53. The collar retainer 43 is formed around this thin-diameter portion 63.

Around the central protruding portion 62, a protruding portion 64 which protrudes inward in the axial direction is formed in order to form a recess portion in the outer surface of the bearing holder portion 32 along the axial direction.

The split die 70 has recess portions 71 for forming the inner surfaces of the bolt mounting portions 22c along the axial direction, a slope portion 72 for forming the outer surface of the slope portion 31 along the radial direction, a cylinder forming portion 73 for forming the periphery of the hub cylindrical portion 30, and a brake flange portion 74 for forming the outer surface of the brake flange 32 along the radial direction. Similarly, the split die 80 has a recess portion 81, a slope portion 82, a hub cylindrical portion 83, and a brake flange portion 84.

These split dies 50 to 80 are combined to form the basic shapes of cavities 90 to 98. Of these, the cavity 90 corresponds to the hub cylindrical portion 30. The cavity 91 corresponds to the collar retainer 43. The cavity 92 corresponds to a portion on the radially inner side of the slope portion 31 where the lightening portion 42 is formed. Reference numeral 93 denotes the outline of an outer portion of the lightening portion 42. The cavity 94 corresponds to the bearing holder portion 32. The cavity 95 corresponds to a radially outer portion of the slope portion 31. The cavity 96 corresponds to the bolt mounting portion 22a. The cavity 97 corresponds to the brake flange portion 32. The cavity 98 corresponds to the bolt mounting portion 32a. Further, the space formed between the central protruding portion 53 and 63 of the split dies 50 and 60 forms a portion corresponding to a portion 100 (indicated by hatching of two-dot lines) to be cut away. The portion 100 to be cut away is continuous with the portion formed by the cavity 92 and is formed so as to be solid and include a portion corresponding to the lightening portion 42.

When molding is performed using these dies, melted metal filled in the cavities is molded in a cross-sectional shape similar to that shown in FIG. 4. However, the lightening portion 42 is not formed. Instead, the portion 100 to be cut away is formed continuously and integrally with other molded portions. The portion 100 to be cut away is formed from the space between the central protruding portions 53 and 63 of the split dies 50 and 60 to the cavity 92. Accordingly, this solid portion 100 to be cut away is cut to the outline 93 in the radial direction by machining after die forming, thus forming the lightening portion 42 having the final shape shown in FIG. 6.

Figure 6:
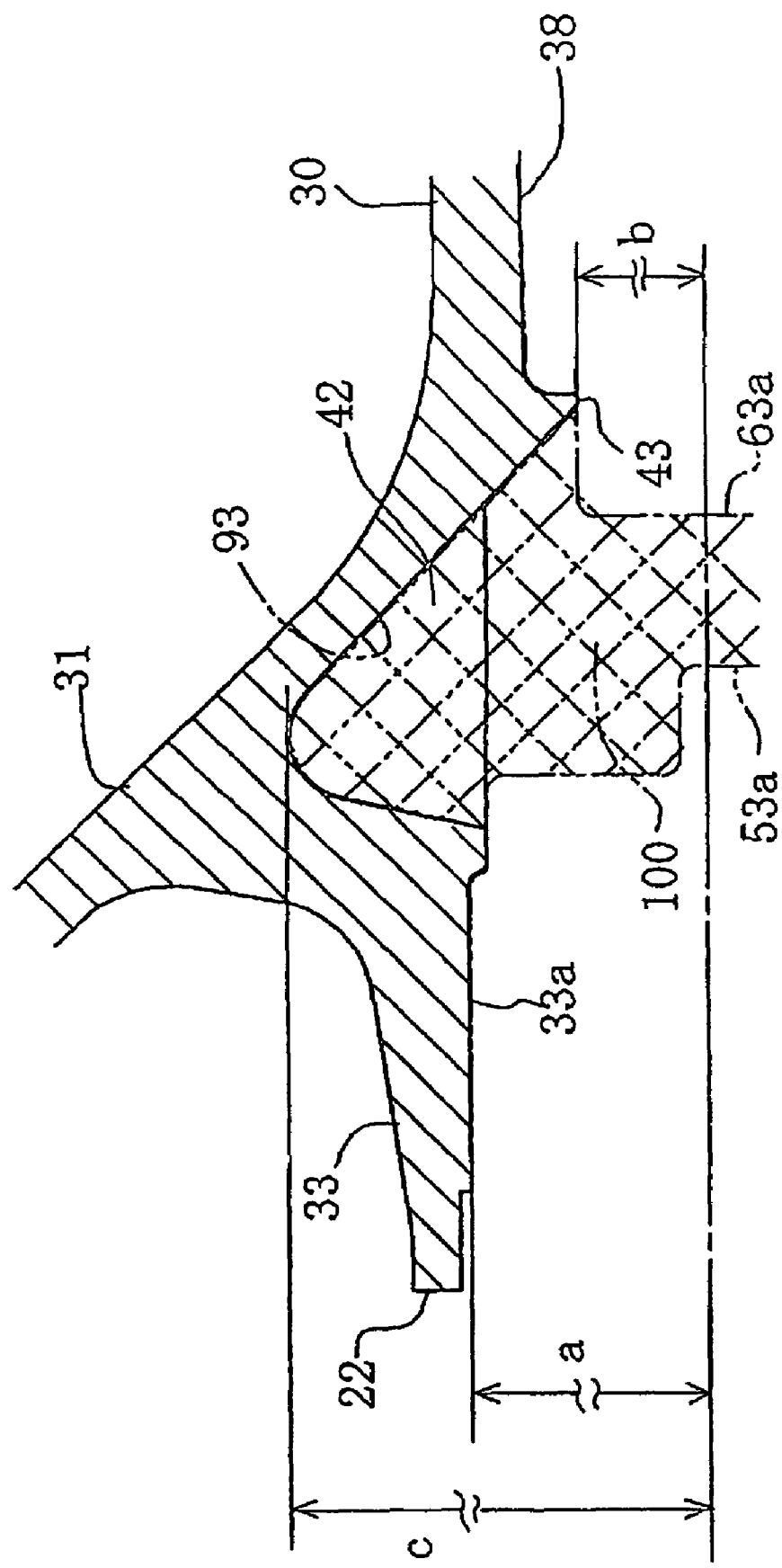
FIG. 6 is an enlarged partial cross-sectional view of a lightening portion.

FIG. 6 is a partial cross-sectional view showing the lightening portion 42. Here, if the hole diameter of the bearing insertion hole 33a is denoted by a, the minimum diameter of the axle hole 38 is denoted by b, and the maximum diameter of the lightening portion 42 is denoted by c, c>a>b. That is, the hole diameters of the bearing insertion hole 33a and the axle hole 38 on opposite sides of the lightening portion 42 along the axial direction are small. Accordingly, if an attempt to form the lightening portion 42 simultaneously with die forming is made, the lightening portion 42 cannot be formed using only the split dies 50 and 60 along the axial direction, and complex dies including a core are needed.

However, the lightening portion 32 can be formed without using dies and a core. When the solid portion 100 formed by the spaces and the like between the central protruding portions 53 and 63 of the split dies 50 and 60 is cut by machining, the solid portion 100 is cut to the outline 93 outward in the radial direction, and thus the lightening portion 42 is formed which is open to the rotation center direction.

Next, the operation of this embodiment is described. Since the recess portion 35 and the lightening portion 42 are provided in the large-scale sprocket flange 22 as described above, the entire hub 20 can be lightened while strength sufficient to receive the driving force is ensured. Here, the lightening portion 42 is formed on the inner side of the sprocket flange 22 along the axial direction, and has a relatively free shape in which the maximum diameter c is larger than the hole diameter a of the bearing insertion hole 33a and smaller than the minimum diameter b of the axle hole 38 that are located on the opposite side along the axial direction. Thus, a wide portion from the surface of the slope portion 31 to the rotation center can be hollowed. Accordingly, the lightening portion 42 can be freely formed to have an optimum shape for obtaining needed strength and realizing sufficient weight reduction, and the strength of the sprocket flange 22 can be efficiently improved.

Further, on the inner surface of the axle hole 38, the collar retainer 43 is formed of an annular protruding portion at the junction between the hub cylindrical portion 30 and the sprocket flange 22. Accordingly, the junction between the hub cylindrical portion and the sprocket flange 22 where stress is most concentrated can be reinforced by the collar retainer 43. In particular, in this embodiment, the lightening portion 42 is formed between the collar retainer 43 and the bearing insertion hole 33a along the axial direction to make the inner portion of the slope portion 31 relatively thin-walled. In spite of this, it is possible to effectively reinforce the junction between the hub cylindrical portion 30 and the sprocket flange 22.

Additionally, the slope portion 31 slopes relatively greatly near the sprocket flange 22, and a cross-sectional change in the junction with the hub cylindrical portion 30 is made gentle. Accordingly, this shape also makes it possible to avoid stress connection in the junction between the hub cylindrical portion 30 and the sprocket flange 22.

Moreover, as shown in FIG. 5, the entire hub 20 can be integrally formed by one-time molding using relatively simple dies including the split dies 50 to 80. Further, the lightening portion 42 is formed by cutting the thick-walled portion of the sprocket flange 22 from the rotation center side in the radial direction by machining after the above-described molding. Accordingly, molding can be performed without using a core, and low-cost manufacture can be performed without using complex and expensive dies.

That is, the lightening portion 42 is open only to the rotation center side, and the maximum diameter c thereof is larger than the hole diameter a of the bearing insertion hole 33a and the minimum diameter b of the axle hole 38, which are located respectively on the left and right along the axial direction. Accordingly, in the case where the entire hub 20 having such a lightening portion 42 is formed integrally by one-time molding, a complex die structure having a core and the like had to be adopted.

If an entire hub is formed by one-time molding without using a core, the position of a lightening portion is formed from the axial direction. Thus, the shape of the lightening portion is limited to one which is open in the axial direction. Accordingly, there are natural restrictions on the shape of the lightening portion, and it has been difficult to freely form the lightening portion having an optimum shape for obtaining needed strength and realizing sufficient weight reduction.

Further, when a core is not used as described above, the following advantages can be obtained.
 a: Molding can be performed at low cost.
 b: Molding can be efficiently performed by high-speed injection.
 c: Variations in product shapes and changes in qualities caused by variations in the operation of a core are eliminated, and internal qualities can be stabilized.
 d: Strength can be freely adjusted by machining, and dies do not need to be corrected every time the strength is adjusted.

Furthermore, the collar retainer 43 is formed at a position of the junction between the hub cylindrical portion 30 and the sprocket flange 22 at a biased position at one end portion of the axle hole 38 along the axial direction. Accordingly, the bearing insertion hole 33a and part of he lightening portion 42 can be formed by the central protruding portion 52 provided in one split die 50 of the split dies 50 and 60 which slide laterally.

The axle hole 38 can be formed by the central protruding portion 62 provided in the other split die 60, and the collar retainer 43 can be formed in the vicinities of the tip portions of the central protruding portions 52 and 62.

Although embodiments of the present invention have been described thus far, the present invention is not limited to the examples in the drawings and the embodiments described above, and various modifications can be made without departing from the scope of the present invention.

We claim:

1. A wheel for a two-wheeled motor vehicle, which includes a hub, a rim, and spokes coupling the hub and the rim, the hub including a hub cylindrical portion and a sprocket flange, the hub cylindrical portion having an axle hole which extends through the hub cylindrical portion allowing insertion of an axle, the sprocket flange being formed at one end portion of the hub cylindrical portion along an axial direction and protruding in a radial direction further allowing attachment of a chain sprocket, the wheel comprising:

a bearing insertion hole through which an axle bearing is provided in a central rotational portion of the sprocket flange coaxially with the axle hole, the bearing insertion hole having a larger diameter than the axle hole, and a lightening portion provided axially inward of the bearing insertion hole, the lightening portion formed in a thick-walled portion of the sprocket flange to open only radially inwardly wherein the bearing insertion hole and the axle hole are located on opposite sides of the lightening portion along a rotational axis of the hub, and a maximum diameter of the lightening portion is larger than diameters of the bearing insertion hole and the axle hole.

2. The wheel according to claim 1, wherein a collar-retaining protruding portion is formed at a position of a junction between the hub cylindrical portion and the sprocket flange on an inner surface of the axle hole.

* * * * *